United States Patent [19]

Stengle

[11] 4,271,212
[45] Jun. 2, 1981

[54] METHOD OF COATING HOT GLASS CONTACTING SURFACES

[75] Inventor: Edward J. Stengle, Toledo, Ohio
[73] Assignee: Owens-Illinois, Inc., Toledo, Ohio
[21] Appl. No.: 41,213
[22] Filed: May 21, 1979
[51] Int. Cl.³ ............................................... B05D 5/08
[52] U.S. Cl. ....................................... 427/203; 65/26; 427/202
[58] Field of Search ........................... 65/26, 169, 304; 427/202, 203; 428/323, 44

[56] References Cited

U.S. PATENT DOCUMENTS

| | | | |
|---|---|---|---|
| 3,002,850 | 10/1961 | Fischer | 427/202 X |
| 3,088,847 | 5/1963 | Pines | 427/387 X |
| 3,441,328 | 4/1969 | Hurley et al. | 427/202 X |
| 3,514,312 | 5/1970 | Gardiner | 427/292 |
| 3,994,703 | 11/1976 | Newing, Jr. et al. | 65/26 |

OTHER PUBLICATIONS

Dow Corning Corp., Dow Corning R-671 Resin, Bulletin 07-2683, Chemical Products Division, Midland Michigan, Jan. 1968.

*Primary Examiner*—Evan K. Lawrence
*Attorney, Agent, or Firm*—E. J. Holler; M. E. Click; D. H. Wilson

[57] ABSTRACT

An improved method is provided for forming surfaces for handling hot glass charges and newly-formed glass articles without detrimental marring or marking of the same. The method comprises priming a relatively-smooth metallic substrate with a silicone resin, applying a coating of a solventless curable thermosetting silicone resin binder over the primer, depositing at least one layer of a heat-resistant granular solid lubricant carbonaceous material over the binder coating and allowing the binder to wet and embed the granular material, and heat-curing the binder to permanently affix the granular carbonaceous material to the substrate to provide a lubricated durable wear-resistant surface for handling hot glass charges or gobs as well as newly-formed glass articles.

9 Claims, No Drawings

METHOD OF COATING HOT GLASS CONTACTING SURFACES

BACKGROUND OF THE INVENTION

This invention is directed to the art of glass manufacturing and more specifically is directed to an improvement in the area of handling hot glass charges or gobs as well as newly-formed glass articles. The invention provides a method of preparing heat-resistant lubricious surfaces which are able to convey or handle such glass charges or articles without deleteriously affecting the contacting surfaces of the charges or articles.

In one common method of glass manufacture, charges or gobs of molten glass are severed from a supply body or feeder for molten glass and are conveyed by free fall over chutes to molds or other apparatus for forming the glass articles.

Important considerations are involved in conveying the gob or charge from the glass feeder to the mold or other forming mechanism. Initially, the time interval of travel must be constant in order to ensure efficient and uniform operation. Secondly, the gob shape must not be seriously altered during travel since any marked alteration may cause distortion or irregularities in the finished article. Thirdly, the surface of the gob must not be unduly chilled or contaminated in the manufacture of high-quality glassware.

Where the chutes for conveying the glass are plain metal or other untreated material, the hot glass gob exhibits a tendency to become adhered thereto resulting in either a failure to travel to the mold in the required time or a distortion of the gob shape. The gob is caused to slow down or is dragged by excessive or uneven temperature conditions of the chute. To overcome such problems, it has been common practice to lubricate the chute by either an intermittent or continuous flow of oil or an oil-based dope. Such treatment of the chute facilitates the passage of the glass but is only a temporary treatment and necessitates frequent or continuous application of the oil or oil-based dope. Despite such continued application, the travel time of the glass gob is frequently extremely erratic and not constant. Also, the oil dope has a tendency to form carbonaceous deposits on the gob which are carried into the finished article. The extreme variation in lubrication may also cause the gob to become scratched or marred producing scars or imperfections in the finished article. In addition, the oil and water which are usually present in the area of glass forming apparatus if excessive tend to further complicate the problem of lubrication by forming deposits on the chute working surface which adversely affect the lubricating action.

It is known that satisfactory coatings for chutes must meet the following requirements: First, the frictional drag must be reduced to a minimum so that downward travel of the gob by gravity is fast and constant, and the shape of the gob is not altered. Second, the coating must be hard and abrasion resistant in order not to contaminate the surface of the gob and to resist rapid wear of the chute surface. Third, the coating must be extremely resistant to heat. Fourth, the coating must be resistant to oil and water which are frequently present in the vicinity of the apparatus.

In the prior art, such coatings have frequently been of the type which include a thermosetting resin and a lubricating filler such as graphite or molybdenum disulphide. Such coatings are disclosed in U.S. Pat. No. 2,758,421 to R. M. Smith, issued Aug. 4, 1956, entitled, "Chute For Conveying Molten Glass", which patent is assigned to the same common assignee as the present application.

SUMMARY OF THE INVENTION

Accordingly, it is an object of this invention to provide a method for applying a coating for glass delivery chutes and other hot glass handling equipment which coating eliminates the difficulties inherent in oil dope lubrication and other solid coatings which are unable to fulfill the aforesaid long-term requirements for such use.

This invention provides an improvement in the method for forming surfaces for handling hot glass charges or gobs and newly-formed glass articles without detrimental marring or marking of the same. The method comprises priming a relatively smooth metallic substrate such as steel or aluminum with a silicone resin coating, applying a solventless silicone resin binder coating on the primer and embedding a granular heat-resistant carbonaceous material therein to provide a lubricated durable heat and wear-resistant surface for handling hot glass charges and articles.

DESCRIPTION OF THE PREFERRED EMBODIMENT

In a preferred example of the present invention, a metallic chute comprised of steel or aluminum having a smooth surface in the form of a hollow trough is taken as the substrate. The metal surface to be coated is cleaned by heating at about 700° F. for one hour to burn off organic contaminants. The surface is then grit blasted. The surface is cleaned further by a solvent rinse using 1, 1, 1 trichloroethane, one such product being Chlorothene NU solvent made by Dow Chemical Company. This solvent is especially designed for metal cleaning applications as well as general solvent use.

After the surface is thoroughly cleaned, it is coated with a metal primer such as monomeric/polymeric reactive silicone resin, a preferred material being Product No. AP-132 manufactured and distributed by Lord Chemical Company. This material is a solution of a reactive silicone resin which can be applied to a variety of substrates to promote adhesion. The primer is a slightly hazy water-white liquid having a solids content of about 5% by weight. For optimum results with such primer, the metallic substrate must be clean and free of oil and greases. The primer serves to enhance adhesion of the lubricant coating for its permanence in a hot and wet environment. The primer is allowed to air-dry after its application by brushing or spraying. The selected primer permits bonding the monomeric silicone resin to the metallic substrate and to an overlying solventless silicone resin which serves as a binder.

After the working surface of the trough or chute is coated with the air-dried primer, a solventless reactive silicone resin such as General Electric Product No. SR-191 modified with a silicone resin such as Owens-Illinois (O-I) Product No. O-I T-908 is applied over the primer as a binder. Graphite such as Union Carbide (U-C) Product No. 38 is also added as a filler. A preferred formulation of the binder consists of the following:

| Binder Formulation | |
| --- | --- |
| GE # SR-191 | 70 gm |

| Binder Formulation | |
|---|---|
| O-I # T-908 | 30 gm |
| U-C # 38 | 30 gm |
| TOTAL | 130 gms |

The reactive silicone resin General Electric Product No. SR-191 may be described as a methoxy functional essentially solventless, 100% non-volatile, clear liquid reactive intermediate silicone resin. It is used as a silicone polyester copolymer vehicle for heat-cured finishes which are normally applied by coil coating methods to prefinished metal surfaces. Copolymers of the subject silicone resin and other organic resins can be prepared using conventional resin process techniques and equipment. Copolymer vehicles which are prepared using the subject silicone resin component (A) possess extremely high durability and (B) possess resistance to loss of gloss, color fade and chalking. Typical properties of the SR-191 silicone resin are:

| | |
|---|---|
| Methoxy Content (Wt %) | 15 |
| Average Combining Weight | 206 |
| Specific Gravity (@77° F.) | 1.13 |
| Weight per gallon (lbs) | 9.4 |
| Viscosity - Brookfield (@77° F.) Approximate Number | 80 |
| Average Molecular Weight | 600 |

The Owens-Illinois Glass Resin Polymer, Product No. T-908 Regular is an organopolyxiloxane resin designed for high-temperature laminating applications which require considerable retained flexural strength when the laminate is exposed to elevated temperatures for a prolonged period of time.

The subject organopolysiloxane resins are produced by the cohydrolysis and co-condensation of different alkylsilanes employing the steps of: (a) heating the reaction mixture to form a partial condensation product (b) concentrating this product, (c) precuring the concentrated product, and (d) finally curing the precured product. The resins are useful as machinable, heat-resistant, thermoset bodies or as coatings. The subject resins and processes of making same are disclosed and claimed by U.S. Pat. No. 3,389,121 to Burzynski and Martin, issued June 18, 1968, which patent is assigned to the same common assignee as the present application.

The following are typical of flake prepared from Owens-Illinois Glass Resins No. T-908 Regular:

| | |
|---|---|
| Weight Loss to gel | 3-4% |
| Weight Loss Get to Cure | 3-4% |
| Viscosity - (Brookfield) | |
| of 50% solution in xylene (w/w) | 21 cps |
| of 40% solution in xylene (w/w) | 9 cps |
| of 30% solution in xylene (w/w) | 5-6 cps |

The flake resin is fully soluble in the following solvents: benzene, xylene, tetrahydrofuran, acetone, dethyl ether, ethanol, chloroform, and ethylene dichloride.

The Product No. T-908 resin refers to a hardenable thermosettable organopolysilane resin solution (60% by weight resin solids in xylene) in which the organic groups are methyl and phenyl siloxane, and wherein the ratio of these organic groups, i.e. the ratio of methyl and phenyl radicals per silicone atom (R: Si ratio) is about 1:4 and wherein the ratio of methyl and phenyl radicals on a mol basis is about 3.3:1, both of these values being based on analyses. The T-908 solid resin is soluble in the liquid SR-191 resin. The T-908 resin in the prepolymer liquid form is also compatible with the SR-191 resin to produce the liquid coating binder material. However, the T-908 resin in flake form is used to combine with the SR-191 resin in this invention.

The binder is prepared by blending the O-I T-908 spray-dried flake resin with the GE SR-191 solventless liquid silicone resin under low heat conditions of less than about 150° F. The O-I T-908 resin is first crushed into powder form since it is slowly soluble. When complete solubility of the O-I T-908 resin in the GE SR-191 resin is achieved, the graphite component is added with thorough mixing. A particularly useful graphite to be employed in the subject coating consists of Union Carbide Product No. 38 manufactured and sold by Union Carbide Chemical Company. Such graphite is described as electric furnace, or synthetic, graphite and is supplied as a dry finely-divided particulate material.

At least one coat of the binder is applied over the primer coating by brushing or spraying and allowed to air-dry. If desired, two or more coats can be applied where a thicker coating is preferred for greater wear resistance. The binder has a solids ratio of about 3 to 1 in the case of the two silicone resin components, although this ratio may be varied within limits.

After the binder coating is applied, it is sufficiently viscous to experience minimal flow prior to immediate application of an overcoat of granular material. The particle size of the granular top coat is important to the paste coating thickness, wear resistance, density and uniformity. The preferred granular material consists of larger mesh size graphite or other carbonaceous material having a particle size ranging from 10 to 100 US mesh as compared with powdered graphite. The latter is used in the primer coating as a filler material. The granular top material may also include activated charcoal in particulate form, one desirable product being #155 carbon ranging from 30 to 50 US mesh. A preferred granular top coat consists of the following:

| Structural Solids Formulation | |
|---|---|
| Barnebey-Cheney #155 Carbon | 10 gm |
| Asbury #4015 Graphite | 15 gm |
| Asbury #4058 Graphite | 75 gm |

Among the structural solids which are used as the top coat are the following have the indicated particle sizes:

| | |
|---|---|
| #155 carbon | 30 to 50 mesh |
| #4058 graphite | 10 to 50 mesh |
| #4015 graphite | 50 to 100 mesh |

The Barnebey-Cheney carbon is obtainable from Barnebey-Cheney, Columbus, Ohio, while the Asbury graphite is obtainable from Asbury Graphite Mills, Inc., Asbury, N.J.

The mixed structural solids are loosely applied over the soft binder coating to a depth of about 1 inch to be at least partially embedded therein and the combined materials are allowed to stand for at least 30 minutes. Sufficient time must be allowed to permit the binder to be absorbed by the granular materials to develop the desired thickness. The excess loose structural solids, which are not wetted by the binder, are removed from the top layer by inverting the trough working surface and brushing the same therefrom. The unused solids, which are easily removable, are reclaimed for further use. The binder and structural solids on the substrate are then heated to about 500° to 550° F. for a period of about 1½ hours to a combined thermoset condition. Thus, the binder is heat-cured to firmly retain the partially and fully embedded structural solids therewithin.

Another coating of the binder is applied over the previously applied granular solids by brushing to wash off and fill the interstices between the granules. Then the binder is heat-cured again as previously to form a hard thermoset material.

After the solids are permanently adhered to the substrate to form a composite hard, durable lubricant coating, the surface is smoothed by buffing or polishing to eliminate the roughness of the exterior surface as formed. A second coating of binder and solids may be applied over the first coating in the same manner if desired for extremely severe end use. The binder serves to wet and surround the solid granular particles in its liquid state, and to permanently retain the same firmly in place in its cured state.

The activated charcoal or carbon component of the exterior structural solids functions to absorb the binder due to this material being very porous and absorbent. The graphite component functions to develop a low-friction wear-resistant surface for contacting hot glass. The particle size of the solids being from 10 to 100 US mesh is important to attain desired structural properties and thickness in the coating. The distribution of the structural solids on the coating exterior is important to the uniformity of the coating thickness. The combined charcoal and graphite granules provide structural integrity to the surface, giving it both wear and heat-resistance for long-term use.

It is possible to employ either graphite or charcoal granular particles alone as the structural solids. However, a mixture of the two is preferred for hot glass gob handling. In the coating of a gob delivery chute, graphite alone provides a level of porosity sufficient to form a suitable working thickness. Also charcoal or carbon alone is suitable as the structural solids for coating glass bottle transfer parts such as sweep-outs, curve chain and lehr bar components. The latter surfaces using charcoal or carbon as the structural solids component are especially desirable due to their heat-transfer behavior.

Thus, it can be readily seen that the preferred coating is comprised of a primer (one coat), a binder (two coats) plus the overcoat of granular solids. Also, another coating of the binder plus the top coat of particulate material to fill in the granular surface of the first coat is desirable where a smoother longer-wearing overcoat is required.

It is also possible to use high-melting metallic oxides as a component for the structural solids. Granular or particulate oxides such as molybdenum disulfide either alone or in combination with graphite can beneficially be used as solid lubricants. Thermally stable materials such as boron nitride can also be used. Mica-type minerals such as talc can also be used in place of the graphite. Obviously heavy metals are to be avoided and not used. Other solid lubricants can be used such as those set forth in the publication "Solid Lubricants—A Survey" published by the National Aeronautics and Space Administration in 1972 (NASA SP-5059 (01)).

The coating has indicated very long life in most severe operating environments in handling hot glass. The coating when fully cured into solidified thermoset condition exhibits no tackiness to detract from its usefulness over a wide range of elevated temperature applications. The silicone and organopolysiloxane resin constituents being essentially solventless do not emit vaporized solvents or create any other deleterious emissions when used as part of the composite material.

Various modifications can be resorted to within the spirit and scope of the appended claims.

I claim:

1. The method of coating a metallic substrate for long-term use in handling hot glass charges or articles comprising the steps of thoroughly cleaning the metallic substrate, applying a primer coating of monomeric/polymeric first silicone resin to said substrate and air drying the same, applying a coating of solventless curable thermosetting second silicone resin binder over said primer coating, depositing at least one layer of granular heat-resistant solid lubricant carbonaceous material over said binder coating and allowing said binder to wet and embed said granular carbonaceous material to firmly retain the same, and heat-curing said binder into thermoset further-hardened condition to permanently affix said granular carbonaceous material to said substrate.

2. The method in accordance with claim 1, wherein said granular heat-resistant carbonaceous material comprises a particulate mixture of activated charcoal and graphite having a particle size ranging from about 10 to 100 US mesh.

3. The method in accordance with claim 1, wherein said binder coating of solventless silicone resin comprises a clear liquid methoxy functional intermediate silicone resin having an average molecular weight of about 600.

4. The method in accordance with claim 1, wherein said primer coating and said binder coating are successively applied as continuous co-extensive layers over said substrate by brushing.

5. The method in accordance with claim 1, wherein the step of heat-curing of said binder coating is preformed at a temperature of about 500° to 550° F., for a period of about 1½ hours.

6. The method in accordance with claim 1, including the steps of applying a second coating of said binder on top of the heat-cured first coating, depositing and embedding a second layer of granular heat-resistant solid lubricant carbonaceous material in said second binder coating, and heat-curing said binder to permanently affix said granular material thereto.

7. The method of coating a metallic substrate to provide a heat and abrasion-resistant surface for long-term use in repeated handling of hot glass charges or newly-formed glass articles comprising the steps of cleaning and grit blasting selected surfaces of the metallic substrate, applying an essentially-uniform coating of a monomeric/polymeric silicone resin primer over said selected surfaces of said metallic substrate, applying a binder coating consisting of a solventless curable silicone resin over said primer coating on said substrate, depositing an essentially-uniform heavy layer of heat-resistant solid lubricant carbonaceous material over said binder coating and allowing said binder coating to wet and embed said granular material, removing the excess unadhered granular material from the coating surface, and heating said binder into thermoset further-cured hardened condition to permanently affix said granular carbonaceous material to said substrate.

8. The method in accordance with claim 7, wherein the said steps of applying said binder, depositing said granular material, and heat-curing said binder are repeated to provide a second layer of said granular carbonaceous material and binder on said granular-binder layer previously deposited and affixed to said substrate.

9. The method in accordance with claim 7, wherein said granular heat-resistant material has a particle size ranging from about 10 to 100 US mesh, and is selected from the group consisting of graphite, carbon, activated charcoal, and high-melting metallic oxide.

* * * * *